US009414407B2

(12) United States Patent
Chen et al.

(10) Patent No.: US 9,414,407 B2
(45) Date of Patent: Aug. 9, 2016

(54) ENHANCED SCHEDULING INFORMATION TRANSMISSION IN A HETEROGENEOUS NETWORK

(71) Applicant: Broadcom Corporation, Irvine, CA (US)

(72) Inventors: Tao Chen, Espoo (FI); Arto Johannes Lehti, Oulu (FI); Karl Markko Juhani Lampinen, Oulu (FI); Christopher Callender, Kinross-shire (GB); Ilmari Repo, Jyvaskyla (FI)

(73) Assignee: BROADCOM CORPORATION, Irvine, CA (US)

( * ) Notice: Subject to any disclaimer, the term of this patent is extended or adjusted under 35 U.S.C. 154(b) by 379 days.

(21) Appl. No.: 14/039,572

(22) Filed: Sep. 27, 2013

(65) Prior Publication Data

US 2015/0092669 A1   Apr. 2, 2015

(51) Int. Cl.
*H04W 4/00* (2009.01)
*H04W 72/12* (2009.01)
*H04W 52/24* (2009.01)
*H04W 52/40* (2009.01)

(52) U.S. Cl.
CPC ........ *H04W 72/1289* (2013.01); *H04W 52/244* (2013.01); *H04W 52/40* (2013.01)

(58) Field of Classification Search
CPC .......... H04W 72/1289; H04W 52/244; H04W 52/40
See application file for complete search history.

(56) References Cited

U.S. PATENT DOCUMENTS

2008/0049669 A1* 2/2008 Lundby ................ H04W 24/10 370/329
2008/0069035 A1* 3/2008 Pinheiro ................ H04L 47/10 370/328
2008/0273463 A1* 11/2008 Whitehead ............ H04L 1/1887 370/235
2010/0188969 A1* 7/2010 Kim ................... H04W 72/1284 370/216

FOREIGN PATENT DOCUMENTS

GB          2496959          5/2013

OTHER PUBLICATIONS

R1-110687 by Qualcomm Inc.; Interference Issues in Heterogeneous Networks for HSPA; 3GPP TSG RAN WG1 Meeting #64;Taipei, Taiwan; Feb. 21-25, 2011 (12 pages).
3GPP TS 25.321 V11.4.0; Medium Access Control (MAC) protocol specification (Release 11); pp. 1-7, 175-176; Jun. 2013 (9 total pages).

* cited by examiner

*Primary Examiner* — Abdelnabi Musa
(74) *Attorney, Agent, or Firm* — Oblon, McClelland, Maier & Neustadt, L.L.P.

(57) ABSTRACT

In a heterogeneous network environment where both high and low power nodes are sharing the same channel/frequency, explicit signaling in a downlink control message is used to select whether scheduling information SI is to be transmitted by a user equipment UE with a data payload or without a data payload. For the case where the selection is that SI is to be transmitted with a data payload, the downlink control message is used for the UE to select a transport format combination TFC for transmission of the SI with the data payload. Else for the case where the selection is that SI is to be transmitted without a data payload, the downlink control message is used for the UE to select transmit power for the transmission of the SI without the data payload.

18 Claims, 5 Drawing Sheets

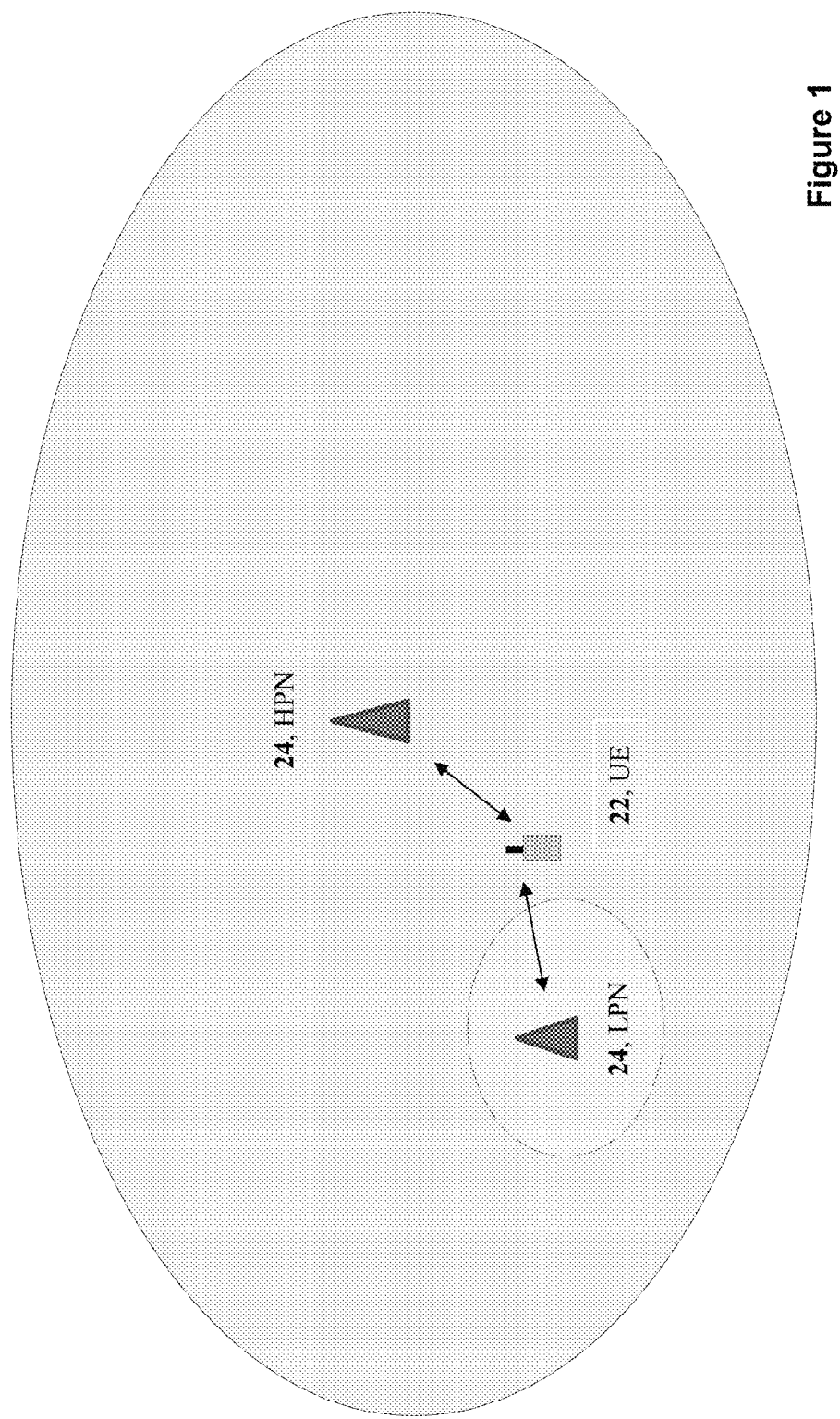

| b4 | b3 | b2 | b1 | b0 |
|---|---|---|---|---|
| "0": Standalone SI | 16 values for SI power offset (e.g., 1 dB step) | | | |
| "1": Payload associated SI | 16 values for E-TFC Selection Power backoff (e.g., 1 dB step) | | | |

Figure 2A

| b4 | b3 | b2 | b1 | b0 |
|---|---|---|---|---|
| "0": Standalone SI | "0": not controlled by non-serving E-RGCH | 8 values for SI power offset (e.g., 1.5dB step) | | |
| "1": Payload associated SI | "1": controlled by non-serving E-RGCH | 16 values for E-TFC Selection Power backoff (e.g., 1 dB step) | | |

Figure 2B

| Scheduling Information Configuration | MP | | | | REL-6 |
|---|---|---|---|---|---|
| >Periodicity for Scheduling Info – no grant | MD | | Enumerated (everyEDCHTTI, 4,10,20,50,100,200, 500,1000) | Values in ms. Default value is "no report" NOTE 1. | REL-6 |
| >Periodicity for Scheduling Info – grant | MD | | Enumerated (everyEDCHTTI, 4,10,20,50,100,200, 500,1000) | Values in ms. Default value is "no report" NOTE 1. | REL-6 |
| >Power Offset for Scheduling Info | MP | | Integer (0..6) | Only used when no MACd PDUs are included in the same MAC-e or MAC-i PDU. Unit is in dB. | REL-6 |
| >SI Transmission Mode | | | Enumerated( Standalone SI,Payload associated SI) | | |
| > SI Transmission Power Fallback Mode | | | Enumerated( E-TFC Selection Power backoff, Serving Grant) | | |
| >E-TFC Selection Power backoff when Transmitting Scheduling Info | | | Integer (0..15) | Only used when MACd PDUs are included in the same MAC-e or MAC-i PDU. Unit is in dB. | |

Figure 3

402: use explicit signaling in a downlink control message to select whether scheduling information is to be transmitted by a user equipment with a data payload or without a data payload 404: if the selection is that scheduling information is to be transmitted with a data payload, use the downlink control message for the user equipment to select a transport format combination for transmission of the scheduling information with the data payload 406: else if the selection is that scheduling information is to be transmitted without a data payload, use the downlink control message for the user equipment to select transmit power for the transmission of the scheduling information without the data payload

Figure 4

ENHANCED SCHEDULING INFORMATION TRANSMISSION IN A HETEROGENEOUS NETWORK

TECHNICAL FIELD

The exemplary and non-limiting embodiments of this invention relate generally to wireless communication systems, methods, devices and computer programs, and more specifically relate to the transmission of scheduling information in a heterogeneous network environment.

BACKGROUND

Heterogeneous network (HetNet) deployments have low power nodes or small cells located throughout a macro-cell layout. Cellular operators have shown significant interest in HetNet deployments as a mechanism to enhance system performance, either in expanded coverage, increased capacity of number of users or data throughput, or both. One HetNet deployment has one or more of the low power nodes using the same carrier frequency as the macro cell, which tends towards co-channel interference.

Document R1-110687 by Qualcomm, Inc. entitled "INTERFERENCE ISSUES IN HETEROGENEOUS NETWORKS FOR HSPA" [3GPP TSG RAN WG1 Meeting #64; Taipei, Taiwan; 21-25 Feb. 2011] presents such a co-channel deployment for study of the evolution of High Speed Packet Access (HSPA) in the Third Generation Partnership Project (3GPP). Specifically, introduction of the low power nodes to the macro cell brings challenges for reliability of the control channel (namely, the high speed dedicated physical control channel or HS-DPCCH) and also for interference management between the low power nodes (LPNs) and high power nodes (HPNs). Mobility in wideband code-division multiple access (WCDMA) systems, including HSPA, is typically handled by using power measurements of the downlink common pilot channel (CPICH) which the network node B broadcasts with constant power. The CPICH technique has worked well in the past but it is a downlink metric only; in a HetNet scenario there are more likely to be several possible handover candidates and so to choose the best one it is useful to know the uplink pathloss from the mobile unit (more generally, a user equipment or UE) to each node B. Using uplink pathloss as a handover criteria helps ensure that the node B having the lowest pathloss will be used as the serving cell for the enhanced data channel (E-DCH).

In homogeneous network deployments where node B transmission powers are the same (e.g., all cells are macro cells), the CPICH measurements taken by the UEs are proportional to pathloss. This is not the case in HetNet deployments due to different transmission powers of the HPN node Bs versus the LPN node Bs.

One HetNet deployment option to avoid the reliability problem of the HS-DPCCH is to use what is known as a dedicated controller deployment in which the LPNs and the HPN are under control of different radio network controllers (RNCs). This deployment allows operators a more flexible choice of vendors, and could be a valuable solution when, for example, the RNC encounters capacity limits or limits to its HPN (node B) port connectivity. But the different RNCs would mean soft handover of the UEs would not be supported between an HPN and an LPN, and also the co-channel interference problem is likely to become more severe.

Consider again a more traditional HetNet deployment with the HPN and its nearby LPNs under the same RNC, which means soft handovers are supported. If there is an imbalance in the uplink (UL) versus downlink (DL) for E-DCH serving cell (i.e., having the best downlink with the strongest received signal but not the best uplink with the shortest pathloss), the UL scheduling information (SI) that includes the UE's uplink power headroom (UPH) and its data buffer status might not be received correctly by the serving E-DCH cell. This is because power control for the DPCCH is dominated by the best uplink of the radio link set (RLS) whereas the SI is only targeting the serving E-DCH cell which might have the worst uplink.

Document R1-110687 describes this also in its discussion at section 2 concerning the shared controller deployment scenario (same RNC for HPN and LPN); the strength of the signal received by each network node (HPN and LPN) does not depend on that node's downlink transmit power. Introduction of the LPNs potentially causes large uplink/downlink (UL/DL) imbalances in that cells other than the serving cell can receive much stronger UL signals from the UE than the serving cell receives. So for example a UE in soft handover from a serving HPN to a LPN can have a much better uplink with the LPN. The LPN can then give power commands to the UE such that the UE's transmit power is reduced to the extent that the still serving HPN gets only a very weak signal from it, resulting in the serving HPN being unable to reliably decode the UE's HS-DPCCH (which carries acknowledgements ACKs and negative ACKS (NACKs) as well as channel quality information CQI). Since the HPN is still the serving cell, this unreliable ACK/NACK decoding would result in excessive re-transmissions of data the UE may have already properly received, which degrades at least the DL performance. There are also interference issues for the co-channel HetNet deployment, for example when the interference victim LPN is not in the active set of the UE being served by a HPN and so the victim LPN has no opportunity to provide the UE with power control commands.

Distilling the above concerns, the problem then is how to address these large power imbalances that arise in co-channel HetNet deployments where the UL pathloss is not linearly analogous to the measured DL metric. The solution should be for a shared controller deployment where the HPN and the LPN are under the same RNC in order to support soft handover. The teachings below can be employed to address this problem, though this is but one non-limiting implementation thereof.

SUMMARY

In a first exemplary embodiment of the invention there is a method comprising:
  using explicit signaling in a downlink control message to select whether scheduling information is to be transmitted by a user equipment with a data payload or without a data payload; and
  if the selection is that scheduling information is to be transmitted with a data payload, using the downlink control message for the user equipment to select a E-DCH transport format combination for transmission of the scheduling information with the data payload;
  else if the selection is that scheduling information is to be transmitted without a data payload, using the downlink control message for the user equipment to select transmit power for the transmission of the scheduling information without the data payload.

In a second exemplary embodiment of the invention there is an apparatus comprising a processing system. Such a processing system may for example include at least one processor and at least one memory storing a computer program. In this embodiment the processing system is configured with the at least one processor to cause the apparatus to at least:

use explicit signaling in a downlink control message to select whether scheduling information is to be transmitted by a user equipment with a data payload or without a data payload; and if the selection is that scheduling information is to be transmitted with a data payload, use the downlink control message for the user equipment to select a E-DCH transport format combination for transmission of the scheduling information with the data payload;

else if the selection is that scheduling information is to be transmitted without a data payload, use the downlink control message for the user equipment to select transmit power for the transmission of the scheduling information without the data payload.

In a third exemplary embodiment of the invention there is a computer readable memory storing a computer program that is executable by at least one processor, and the computer program comprises:

code for using explicit signaling in a downlink control message to select whether scheduling information is to be transmitted by a user equipment with a data payload or without a data payload;

code, whose execution is contingent on the selection being that scheduling information is to be transmitted with a data payload, for using the downlink control message for the user equipment to select a transport format combination for transmission of the scheduling information with the data payload; and code, whose execution is contingent on the selection being that scheduling information is to be transmitted without a data payload, for using the downlink control message for the user equipment to select transmit power for the transmission of the scheduling information without the data payload.

These and other embodiments and aspects are detailed below with particularity.

BRIEF DESCRIPTION OF THE DRAWINGS

FIG. 1 is a schematic diagram illustrating an environment in which embodiments of the invention may be practiced to advantage.

FIGS. 2A-B illustrate for two different embodiments different meanings for five different bits in a downlink control message according to various embodiments of these teachings.

FIG. 3 is a table showing the E-DPDCH information field with rows 1-3 showing prior art information and rows 4-6 showing new information according to the various embodiments of the teachings presented herein.

FIG. 4 is a logic flow diagram that illustrates the operation of a method, and a result of execution of computer program instructions embodied on a computer readable memory, in accordance with the exemplary embodiments of this invention.

DETAILED DESCRIPTION

Figure 5:
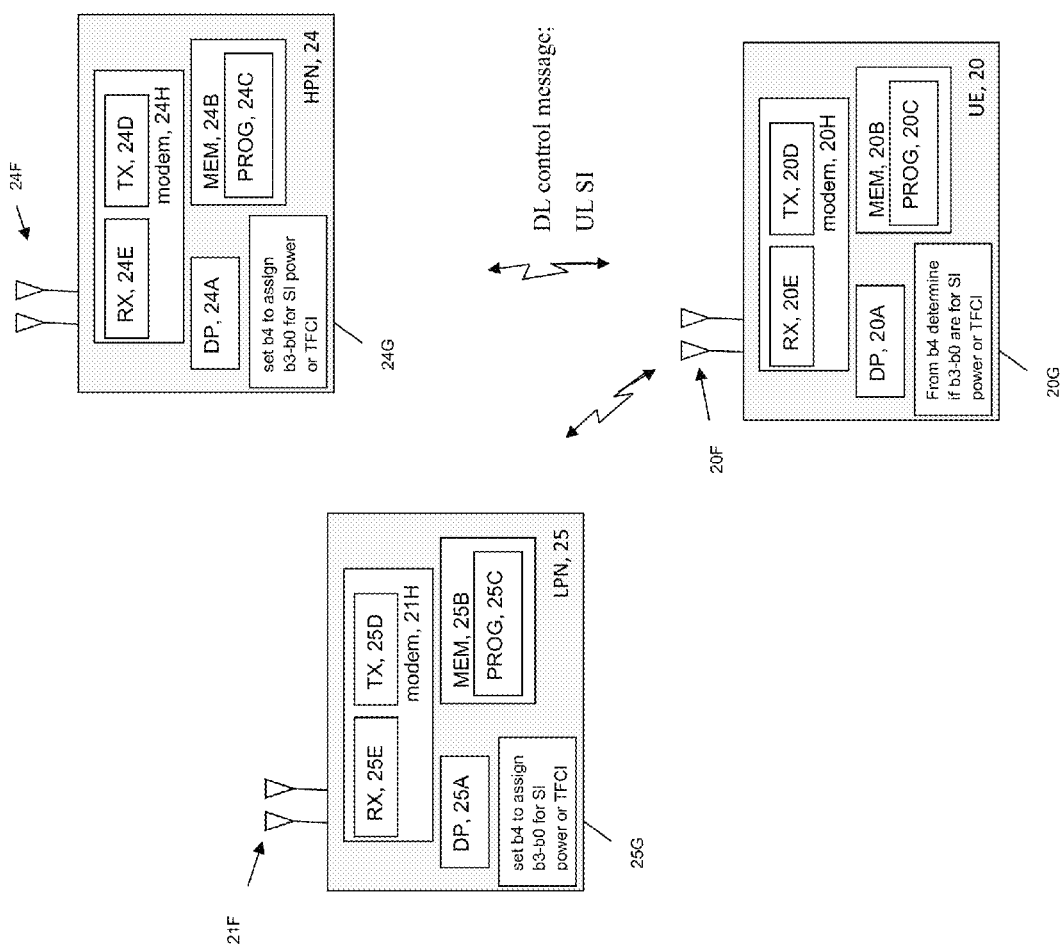
FIG. 5 is a simplified block diagram of various devices shown at FIG. 1, which are exemplary electronic devices suitable for use in practicing the exemplary embodiments of the invention.

An environment in which embodiments of the invention may be practiced with advantage is shown at FIG. 1. There are two different network access nodes; a HPN 24 which controls a macro cell whose geographic area is delineated by the shaded oval, and a LPN 25 which controls a pico cell whose geographic area is shown as a subset of the macro cell. FIG. 1 therefore illustrates a Heterogeneous network (HetNet), which in this particular example it is assumed both the HPN 24 and the LPN 25 are under control of the same higher network entity, whether that entity is a Radio Network Controller in the case the HetNet is operating as a Universal Terrestrial Radio Access Network (UTRAN) or some other entity if the HetNet is operating with some different radio access technology such as for example evolved UTRAN (E-UTRAN). If a UTRAN the HPN 24 and LPN 25 are embodied as node Bs, or if an E-UTRAN the HPN 24 and LPN 25 are embodied as e-node Bs. These also include embodiments as remote radio heads (RRHs) or relay stations of a node B or e-node B. In practice there are likely to be multiple LPNs with corresponding pico cells within a given macro cell and some of those pico cells may extend beyond the macro cell itself, but for purposes of this description one HPN 24 and one LPN is sufficient for illustration to support the inventive concepts herein.

In FIG. 1 there is also a user equipment (UE) 20 which is shown as a mobile handset, but which may alternatively be implemented as a wearable radio, a vehicle mounted radio, or any number of other physical manifestations of a mobile-enabled radio which communicates with one or both of the HPN 24 and LPN 25. In practice there is likely to be multiple UEs communicating with the HPN 24 and LPN 25, each of which can be operating according to the inventive teachings detailed below.

The UE 20 has at any given time one serving cell, which for purposes of FIG. 1 will be either the HPN 24 or the LPN 25. The term 'cell' is used interchangeably herein with the radio network access node (HPN 24 or LPN 25 in FIG. 1) that controls the geographic cell area.

The issues of SI transmission in a HetNet deployment such as that of FIG. 1 are acknowledged by the 3GPP. Co-owned UK patent application serial no. GB1219717.4, filed on Nov. 2, 2012 and entitled METHOD AND APPARATUS FOR OBTAINING RELIABLE E-DCH RECEPTION FOR TRANSMISSION OF SCHEDULING INFORMATION (published on May 29, 2013 as GB2496959, hereby incorporated by reference) offers one solution for the case in which the SI is transmitted with a data payload (and therefore on scheduled radio resources). Specifically, the power backoff is applied to selection of the transport format combination indicator (TFCI) for the enhanced data channel (E-DCH) so that this E-TFCI is selected by subtracting SI_backoff_db from the transmit power for the original resource grant. The actual transmission will still be made using transmission power that is calculated based on the original grant. Selecting E-TFCI in this way lowers the data rate and boosts the transmission power in order to increase the likelihood that the packet is received correctly.

The above solution relies on transmit power of the resource grant, but there are other ways to send scheduling information (SI). Generally there are three ways as set forth by 3GPP TS-25.321 v11.4.0 (2013-06) in the E-DPDCH information field:

A. Standalone case with no resource grant, i.e., non-scheduled E-DCH transmission for SI message without any data payload.

B. Data payload associated SI transmission with grant (mentioned above).

C. Best-effort SI transmission as long as sufficient space is left.

The above-reference co-owned patent application does not address the standalone SI transmission in bullet A above.

Note that the E-DPDCH information field for the three bullets above are summarized in the first three rows (not counting the row headers) of FIG. 3 and so the specific information in those rows of FIG. 3 may be considered as prior art.

There are different considerations and problems for each of these three approaches. Best effort SI transmission (bullet C above) in a HetNet would have only a small advantage, if any at all, due to E-DCH transport format combination (E-TFC) selection being based on the best link. For the non-grant based standalone SI transmission (bullet A above), there are some slightly different problems than were considered in the above-reference co-owned patent application. Firstly, non-scheduled transmission for SI would not allow the inter-cell interference control via an E-RGCH command by the non-serving cell. And secondly, the power offset for SI transmission can be only (semi-)statically configured, and so it cannot be adjusted dynamically. In the HetNet case with a potential huge imbalance between uplink and downlink transmit powers (UL/DL imbalance), the SI transmission for a moving UE 20 in HetNet may either lead to the excessive inter-cell interference with a too high power offset or a transmission failure with a too low power offset. In the HetNet scenario the power offset required for mitigating a UL/DL power imbalance could be quite high so that it can cause high inter-cell interference, especially in case of multiple macro-pico soft handover UEs with SI transmission targeting macro serving cells with a weak uplink.

Embodiments of these teachings support the standalone SI transmission option in addition to the payload associated SI transmission option. The examples below detail signaling support and dynamic switching between these two approaches. In addition, the examples provide that in one embodiment there is a fallback to the standalone SI transmission with a flexible inter-cell interference control mechanism.

According to one example embodiment, the network will send to the UE 20 signaling to indicate whether that UE 20 should use standalone or payload-associated SI transmission. In the more detailed examples below this signaling is a single bit, in a new physical channel termed herein as a scheduling information control channel (SI-CCH). The structure of this new SI-CCH can be the same as the enhanced absolute grant channel (E-AGCH), with for example five bits "$b_4 b_3 b_2 b_1 b_0$" as shown by example at FIGS. 2A-B which defines the meaning of those five bits for two distinct embodiments. In both FIGS. 2A-B bit b4 selects between standalone SI and payload associated SI. The specific values in those figures and in the description below for bit b4 and for the other various bits are arbitrary and in other deployments can be reversed as compared to those examples. These five bits on the SI-CCH may be considered more generally as a downlink control message.

For the case that the node B signals to its served UE 20 to use standalone SI transmission, there are multiple other bits in that same message to indicate the power offset value for the UE 20 to use for that SI standalone transmission. In FIG. 2A these are indicated by bits b3 through b0, and since there are four bits available for this purpose the power offset step size is 1 dB for example. In FIG. 2B these are indicated by bits b2 through b0, and since there are only three bits available for this purpose the power offset step size in the FIG. 2B embodiment is 1.5 dB for example.

The non-limiting example at FIG. 2B has also, as one implementation option for the SI standalone option, a bit b3 that indicates whether the UE 20 should follow the enhanced relative grant channel (E-RGCH) of the non-serving node B. As a different implementation option, still for the standalone SI transmission this E-RGCH information is carried in a new channel termed herein as a non-serving E-RGCH indication control channel (NEI-CCH). In this example the NEI-CCH shares the same structure as E-RGCH and carries 1 bit with meaning similar to that of bit b3 in FIG. 2B for the same standalone SI transmission option:
  "0": Transmit power is not controlled by non-serving E-RGCH for standalone SI transmission.
  "1": Transmit power is controlled by non-serving E-RGCH for standalone SI transmission.

For the case that the node B signals to its served UE 20 to use payload associated SI, then the multiple other bits in that same message indicate the power backoff value to use for selection of the E-TFC that the UE 20 is to use for its transmission of the SI with the data payload. Note that for the payload-associated SI case the transmission power of the SI with associated data payload is not affected by these E-TFC selection power backoff bits, these bits influence the transport format combination used for that transmission but are not used to directly select the transmission power, which may be done conventionally in this example. In both FIGS. 2A and 2B these are indicated by bits b3 through b0, and like the standalone SI case in FIG. 2A since there are four bits available for this E-TFCI selection purpose the power backoff step size is 1 dB in both FIGS. 2A and 2B. for the payload-associated SI transmission there is no specific signaling for the UE 20 concerning the enhanced relative grant channel (E-RGCH) of the non-serving node B.

In another optional embodiment, there is a relative grant sent from the node B to the UE over a new channel which is used for control as follows. Specifically, for the standalone SI transmission this new channel is termed herein as a standalone SI relative power control channel (SSI-RPCH) and directs the UE 20 to step up or step down from its current standalone SI transmit power; for example:
  "−1": one step down on the current transmit power for standalone SI transmission.
  "+1": one step up on the current transmit power for standalone SI transmission.

In this case the current transmit power for standalone SI transmission is derived from the absolute value in the SI-CCH for standalone SI transmission and the values carried in the previous SSI-RPCH transmissions.

In this optional embodiment, for the case bit b4 in FIGS. 2A-B selects the payload-associated SI transmission the relevant new channel is termed herein as a payload-associated SI relative grant power control channel (PSI-RPCH) and directs the UE to step up or step down, for its next payload-associated SI transmission, the current E-TFC selection backoff value for the payload-associated SI transmission. For example:
  "−1": one step down on the backoff value for payload-associated SI transmission.
  "+1": one step up on the backoff value for payload-associated SI transmission.

In this case the current transmit power for the payload associated SI transmission is derived from the absolute value in the SI-CCH for payload-associated SI transmission and the values carried in previous SSI-RPCH transmissions.

The base station/node B can dynamically control the UE 20 to switch between standalone and payload associated SI transmissions via the signaling detailed above. This dynamic switching can also be controlled by the base station/node B using implicit signaling, such as for example the indications it sends downlink on the SSI-RPCH, and/or the PSI-RPCH. In some deployments the dynamic switching can be implicit; for example if the last received signaling is standalone SI transmission related commands (SI-CCH with $b_4$="1" and/or SSI-RPCH), the UE should use standalone SI transmission. Otherwise, the UE would use payload associated SI transmission.

In this case each dynamic switch is explicitly signaled via bit b4 in the SI-CCH, and it is implicit that the most recent b4 bit value controls until replaced.

As an alternative to each switch between standalone SI and payload-associated SI being explicitly signaled, resource grant based payload associated SI transmission can fall back to grant/non-grant based standalone SI transmission via implicit radio resource control (RRC) signaling. Below are several non-limiting examples of how this alternative might be implemented.

For example, for each SI transmission the UE will do a comparison between the E-TFCI backoff value and the serving grant power value, and if the E-TFCI power backoff value signaled by the RRC signaling is larger than the serving grant power, the UE will autonomously fall back to standalone SI transmission. The SI transmit power can be further determined by the UE as follows. If the SI transmit power is not based on transmit power for a resource grant by the serving node (non-granted based solution), the UE uses the backoff value to set the SI power offset. This may secure the SI quality but can cause degraded inter-cell interference. If on the other hand the SI transmit power is based on transmit power for a resource grant by the serving node (grant based solution), then the serving grant is used to set the SI power offset. This cannot secure the SI quality but it controls the inter-cell interference well. Note that in this case the serving grant transmit power used to set the offset includes the non-serving E-RGCH control that was noted above, see bit b3 of FIG. 2B for the standalone SI option. Whether the UE is to use the above grant based solution or the non-grant based solution can be indicated by the network in RRC or in physical layer signaling.

There can also be implicit RRC signaling for the above fallback mode. In this implementation the E-TFCI power back off value is signaled via RRC signaling for grant based SI transmission. However, in case the serving grant (with non-serving E-RGCH for inter-cell interference control) is smaller than the signaled backoff value, the grant based SI transmission may not be able to transmit SI successfully. In this embodiment falling back to the standalone SI transmission can be done autonomously with the following rules:

For each SI transmission, if the E-TFCI power backoff value signaled by RRC signaling is larger than the serving grant transmit power, the UE will autonomously fall back to standalone SI transmission. In this case bits b3 through b0 of FIGS. 2A-B indicated the E-TFCI power selection backoff for a payload-associated SI transmission, but the UE's power comparison check made it autonomously fallback to standalone SI transmission for which the UE does not have bits to indicate the SI power offset. The UE can in this case determine the SI transmit power as follows.

Non-granted based solution: The backoff value is used to set the SI power offset, which secures the SI quality but degrades inter-cell interference.

Grant based solution: The serving grant transmit power (with non-serving E-RGCH control) is used to set the SI power offset, which cannot secure the SI quality but which does control very well the inter-cell interference.

In case both options are preferred depending on the scenario and significance of SI, the grant based or the non-grant based options can be selected via an indication carried in RRC or physical layer signaling.

The table at FIG. 3 shows in the fourth through sixth rows (excluding the headers) specific embodiments for signaling the information detailed in the examples above, such as via RRC signaling. Recall from above that the information in rows 1 through 3 of that table reproduce information from 3GPP TS 25.331 for the E-DPDCH information field. At the fourth row is the SI transmission mode, which is indicated by bit b4 of FIGS. 2A-B. At the fifth row is the SI transmission power fallback mode, which is given by the E-TFC selection power backoff value given by bits b3 through b0 in FIGS. 2A-B when the indicated payload-associated SI transmission falls back to standalone SI transmission (for example, if the serving grant transmit power is less than the indicated E-TFC selection power backoff). And at the sixth row is the E-TFC selection power backoff when transmitting scheduling information, and is given by bits b3 through b0 in FIGS. 2A-B when the SI is transmitted with an associated payload (non-fallback mode).

Certain embodiments of these teachings as detailed above provide the following technical effects. They enable a robust SI reception in case of soft handover in a HetNet environment; they provide improved efficiency for both standalone and payload associated SI transmissions; and they provide an efficient inter-cell interference control for SI transmission. Certain of the embodiments and implementations also provide flexibility of the base station control on SI transmission, with limited signaling overhead and low complexity in layer 1 (L1, where the low complexity is due to reuse of the existing channel structure). Finally, another advantage is that these teachings enable an autonomous fallback mode via the rule detailed above, based on implicit RRC signaling and on the serving grant.

FIG. 4 summarizes some of the above teachings, and is a logic flow diagram which describes an exemplary embodiment of the invention from the perspective of the UE's serving node (which may be the HPN 24 or the LPN 25) and also of the UE 20 itself. FIG. 4 represents results from executing a computer program or an implementing algorithm stored in the local memory of the HPN, 24, LPN 25, or the UE 20, as well as illustrating the operation of a method and a specific manner in which any of these entities/host devices (or one or more components thereof) are configured to cause that overall host device to operate. The various blocks shown in FIG. 4 may also be considered as a plurality of coupled logic circuit elements constructed to carry out the associated function(s), or specific result of strings of computer program code stored in a memory.

Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

At block 402 explicit signaling in a downlink control message (shown at FIGS. 2A-B for example) is used to select whether scheduling information is to be transmitted by a user equipment with a data payload or without a data payload. Block 404 gives the option if the selection is that scheduling information is to be transmitted with a data payload, namely using the downlink control message for the user equipment to select a transport format combination (E-TFCI in the above examples) for transmission of the scheduling information with the data payload. Else if the selection is that scheduling information is to be transmitted without a data payload, block 406 gives the solution of using the downlink control message for the user equipment to select transmit power for the transmission of the scheduling information without the data payload.

For the case in which the operations of FIG. 4 are performed by a serving node of the UE, whether that serving node is the HPN or the LPN of FIG. 1, the serving node performs block 402 by sending the downlink control message to the user equipment to cause the user equipment to select whether scheduling information is to be transmitted with a data payload or without a data payload. To perform block 404 the serving node sets bit values in the downlink message for selecting the transport format combination for the case where the scheduling information is to be transmitted with the data payload. And to perform block 406 the serving node sets bit values in the downlink message for selecting the transmit power for the case where the scheduling information is to be transmitted without the data payload.

For the case in which the operations of FIG. 4 are performed by the user equipment, the UE performs block 402 by receiving from its serving node the downlink control message (and decoding that message) which selects whether the UE is to transmit scheduling information with a data payload or without a data payload. To satisfy block 404 the UE uses bit values in the downlink message to select the transport format combination for the case where the scheduling information is to be transmitted with the data payload, and to satisfy block 406 the UE uses bit values in the downlink message to select the transmit power for the case where the scheduling information is to be transmitted without the data payload.

In the examples above the values for bits b3 through b0 (or bits b2 through b0) were used to select the TFCI or the SI transmission power as block 404 summarizes, but this does not imply that block 404 requires that only bit values of the downlink control message can be used for selecting the TFC and/or SI transmission power. The more detailed examples above have the selection of the TFC and of the SI transmission power depending additionally on other parameters, for example the E-TFC is selected based on both the power grant and the backoff value given by bits b3 through b0.

In one particular but non-limiting embodiment, if the selection at block 402 is that scheduling information is to be transmitted without a data payload, then the downlink control message on a scheduling information control channel, or an indication on a non-serving relative grant channel (NEI-CCH for example), indicates whether the user equipment is to follow a relative power control indication from a non-serving cell.

In another particular but non-limiting embodiment, an indication on a relative power control channel is used to step up or step down transmit power for the transmission of the scheduling information, wherein there are different relative power control channels (SSI-RPCH and PSI-RPCH for example) depending on whether the scheduling information is to be transmitted with a data payload or without a data payload.

In a further non-limiting embodiment, a further switch (subsequent to any switch arising from block 402) between transmission of scheduling information with a data payload and without a data payload, is effected using implicit signaling on a relative grant channel associated with the respective transmission of scheduling information with a data payload or without a data payload (again, the SSI-RPCH and PSI-RPCH are examples of such associated relative grant channels).

In one non-limiting implementation of that further embodiment, switching from transmission of scheduling information with a data payload to transmission of scheduling information without a data payload is autonomous at the user equipment whenever a power backoff value, indicated by the downlink control message and used for the user equipment to select the transport format combination, is larger than serving grant power for the user equipment. In another non-limiting implementation, transmit power for the transmission of scheduling information without a data payload, after the autonomous switching, is either based on or not based on transmit power for a resource grant by a serving node of the user equipment, where the based-on or not-based-on is indicated by downlink radio resource control signaling. In one of the examples above this indication in the downlink radio resource control signaling is implicit.

Reference is now made to FIG. 5 for illustrating a simplified block diagram of various electronic devices and apparatus that are suitable for use in practicing the exemplary embodiments of this invention. In FIG. 5 there is a macro cell or HPN 24 that is adapted for communication over a wireless link (shown as carrying the DL control message and the UL SI) with mobile apparatuses, such as mobile terminals, UEs or user devices 20. The HPN 24 may be embodied as a macro e-Node B (a base station of an E-UTRAN system, a macro node B (a base station in a UTRAN system), or as some other type of base stations or access points adapted to provide WL control messages as above and to support soft handovers in a HetNet.

In one particular implementation, the user device UE 20 may be embodied as a mobile handset such as a smartphone, or a wearable radio, or a vehicle mounted radio, and the like. The UE 20 includes processing means such as at least one data processor (DP) 20A, storing means such as at least one computer-readable memory (MEM) 20B storing at least one computer program (PROG) 20C, and also communicating means such as a transmitter TX 20D and a receiver RX 20E for bidirectional wireless communications with the HPN 24 and the LPN 25 via one or more antennas 20F. The RX 20E and the TX 20D are each shown as being embodied with a modem 20H in a radio-frequency front end chip, which is one non-limiting embodiment; the modem 20H may be a physically separate but electrically coupled component. The UE 20 also has stored in the MEM 20B at block 20G computer program code for receiving and decoding the bits b4 through b0 of the downlink control message and attributing meaning to the b3-b0 bits based on the value/meaning of the b4 bit in the above examples.

The LPN 25 similarly includes processing means such as at least one data processor (DP) 25A, storing means such as at least one computer-readable memory (MEM) 25B storing at least one computer program (PROG) 25C, and communicating means such as a transmitter TX 25D and a receiver RX 25E and a modem 25H for bidirectional wireless communications with the UE 20 via one or more antennas 21F. The LPN stores in its local MEM 25B at block 25G computer program code for deciding and setting the bits b4 through b0 of the downlink control message where the meaning to the b3-b0 bits is based on the value/meaning of the b4 bit in the above examples.

The HPN 24 includes its own processing means such as at least one data processor (DP) 24A, storing means such as at least one computer-readable memory (MEM) 24B storing at least one computer program (PROG) 24C, and communicating means such as a transmitter TX 24D and a receiver RX 24E and a modem 24H for bidirectional wireless communications with UE 20 detailed above via its antennas 24F. The HPN 24 stores at block 24G in its local MEM 24B a computer program for deciding and setting the bits b4 through b0 of the downlink control message where the meaning to the b3-b0 bits is based on the value/meaning of the b4 bit in the above examples.

At least one of the PROGs 20C, 24C, 25C in the respective device 20, 24, 25 is assumed to include program instructions that, when executed by the associated DP 20A, 24A, 25A, enable the device to operate in accordance with the exemplary embodiments of this invention, as detailed above. Blocks 20G, 24G and 25G summarize different results from executing different tangibly stored software to implement certain aspects of these teachings. In these regards the exemplary embodiments of this invention may be implemented at least in part by computer software stored on the MEM 20B, 24B, 25B which is executable by the DP 20A of the UE 20 and/or by the DP 24A/25A of the HPN 24 or LPN 25, or by hardware, or by a combination of tangibly stored software and hardware (and tangibly stored firmware). Electronic devices implementing these aspects of the invention need not be the entire devices as depicted at FIG. 5, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 24B, 25B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 24A, 25A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. A method, comprising:
   selecting, by circuitry using explicit signaling in a downlink control message, whether user equipment is to transmit scheduling information with a data payload or without a data payload;
   using, by the circuitry when the user equipment is to transmit the scheduling information with the data payload, the downlink control message for the user equipment to select a transport format combination for transmission of the scheduling information with the data payload; and
   using, by the circuitry when the user equipment is to transmit the scheduling information without the data payload, the downlink control message for the user equipment to select a transmit power for transmission of the scheduling information without the data payload, wherein
   the user equipment autonomously switches from transmission of the scheduling information with the data payload to transmission of the scheduling information without the data payload when a power backoff value is larger than a serving grant power for the user equipment,
   the power backoff value is indicated by the downlink control message and the power backoff value is used for the user equipment to select the transport format combination, and
   the transmit power for the transmission of the scheduling information without the data payload, after the autonomous switching by the user equipment, is not based on a transmit power for a resource grant by a serving node of the user equipment as indicated by downlink radio resource control signaling.

2. The method according to claim 1, wherein when the user equipment is to transmit the scheduling information without a data payload,
   the downlink control message on a scheduling information control channel, or an indication on a non-serving relative grant channel, indicates whether the user equipment is to follow a relative power control indication from a non-serving cell.

3. The method according to claim 1, further comprising:
   using, by the circuitry, an indication on a relative power control channel to step up or step down the transmit power for the transmission of the scheduling information, wherein
   a number of different relative power control channels varies depending on whether the scheduling information is to be transmitted with the data payload or without the data payload.

4. The method according to claim 1, wherein the user equipment further switches between transmission of the scheduling information with the data payload and transmission of the scheduling information without the data payload according to implicit signaling on a relative grant channel associated with the respective transmission of scheduling information with the data payload or without the data payload.

5. The method according to claim 1, wherein the transmit power for the transmission of the scheduling information without the data payload, after the autonomous switching by the user equipment, is based on a transmit power for a resource grant by a serving node of the user equipment as indicated by downlink radio resource control signaling.

6. The method according to claim 5, wherein an indication of the downlink radio resource control signaling is implicit.

7. The method according to claim 1, wherein when the circuitry is part a serving node that serves the user equipment, the serving node:
   sends the downlink control message to the user equipment; and either
   sets bit values in the downlink message so that the scheduling information is transmitted with the data payload; or
   sets bit values in the downlink message so that the scheduling information is transmitted without the data payload.

8. The method according to claim 1, wherein when the circuitry is part of the user equipment, the circuitry:
   receives from a serving node the downlink control message; and either
   uses bit values in the downlink message to select the transport format combination for transmission of the scheduling information with the data payload; or
   uses bit values in the downlink message to select the transmit power for transmission of the scheduling information without the data payload.

9. An apparatus, comprising:
   circuitry; and
   a memory storing computer instructions that, when executed by the circuitry, cause the circuitry to:

select, using explicit signaling in a downlink control message, whether user equipment is to transmit scheduling information with a data payload or without a data payload;

use, when the user equipment is to transmit the scheduling information with the data payload, the downlink control message for the user equipment to select a transport format combination for transmission of the scheduling information with the data payload; and use, when the user equipment is to transmit the scheduling information without the data payload, the downlink control message for the user equipment to select a transmit power for transmission of the scheduling information without the data payload, wherein the user equipment autonomously switches from transmission of the scheduling information with the data payload to transmission of the scheduling information without the data payload when a power backoff value is larger than a serving grant power for the user equipment, the power backoff value is indicated by the downlink control message and the power backoff value is used for the user equipment to select the transport format combination, and the transmit power for the transmission of the scheduling information without the data payload, after the autonomous switching by the user equipment, is not based on a transmit power for a resource grant by a serving node of the user equipment as indicated by downlink radio resource control signaling.

10. The apparatus according to claim 9, wherein when the user equipment is to transmit the scheduling information without the data payload, the downlink control message on a scheduling information control channel, or an indication on a non-serving relative grant channel, indicates whether the user equipment is to follow a relative power control indication from a non-serving cell.

11. The apparatus according to claim 9, wherein the circuitry is further configured to use an indication on a relative power control channel to step up or step down the transmit power for the transmission of the scheduling information, and a number of different relative power control channels varies depending on whether the scheduling information is to be transmitted with the data payload or without the data payload.

12. The apparatus according to claim 9, wherein the circuitry is further configured to switch between transmission of the scheduling information with the data payload and without the data payload according to implicit signaling on a relative grant channel associated with the respective transmission of scheduling information with the data payload or without the data payload.

13. The apparatus according to claim 9, wherein the transmit power for the transmission of the scheduling information without the data payload, after the autonomous switching by the user equipment, is based on a transmit power for a resource grant by a serving node of the user equipment as indicated by downlink radio resource control signaling.

14. The apparatus according to claim 13, wherein an indication of the downlink radio resource control signaling is implicit.

15. The apparatus according to claim 9, wherein the apparatus further comprises a serving node including the circuitry, the serving node serving of the user equipment, and the serving node:

sends the downlink control message to the user equipment; and either sets bit values in the downlink message so that the scheduling information is transmitted with the data payload; or sets bit values in the downlink message so that the scheduling information is transmitted without the data payload.

16. The apparatus according to claim 9, wherein the apparatus comprises the user equipment, the user equipment includes the circuitry, and the user equipment:

receives from a serving node the downlink control message; and either uses bit values in the downlink message to select the transport format combination for transmission of the scheduling information with the data payload; or uses bit values in the downlink message to select the transmit power for transmission of the scheduling information without the data payload.

17. A non-transitory computer readable memory storing a computer program which, when executed by at least one processor, causes the at least one processor to:

select, using explicit signaling in a downlink control message, whether user equipment is to transmit scheduling information with a data payload or without a data payload;

use, when the user equipment is to transmit the scheduling information with the data payload, the downlink control message for the user equipment to select a transport format combination for transmission of the scheduling information with the data payload; and use, when the user equipment is to transmit the scheduling information without the data payload, the downlink control message for the user equipment to select a transmit power for transmission of the scheduling information without the data payload, wherein the user equipment autonomously switches from transmission of the scheduling information with the data payload to transmission of the scheduling information without the data payload when a power backoff value is larger than a serving grant power for the user equipment, the power backoff value is indicated by the downlink control message and the power backoff value is used for the user equipment to select the transport format combination, and the transmit power for the transmission of the scheduling information without the data payload, after the autonomous switching by the user equipment, is not based on a transmit power for a resource grant by a serving node of the user equipment as indicated by downlink radio resource control signaling.

18. The non-transitory computer readable memory according to claim 17, further wherein when the user equipment is to transmit the scheduling information without the data payload, the downlink control message on a scheduling information control channel, or an indication on a non-serving relative grant channel, indicates whether the user equipment is to follow a relative power control indication from a non-serving cell.

* * * * *